(12) United States Patent
Tilikin et al.

(10) Patent No.: US 10,574,530 B2
(45) Date of Patent: Feb. 25, 2020

(54) SYSTEM AND METHOD FOR PROCESSING OF CURRENT AND HISTORICAL IMPACT STATUS INFORMATION

(71) Applicant: ServiceNow, Inc., Santa Clara, CA (US)

(72) Inventors: Alexei Tilikin, Petah (IL); Neta Hasdai, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 377 days.

(21) Appl. No.: 15/487,242

(22) Filed: Apr. 13, 2017

(65) Prior Publication Data

US 2018/0300041 A1    Oct. 18, 2018

(51) Int. Cl.
| | | |
|---|---|---|
| *G06F 11/00* | (2006.01) |
| *H04L 12/24* | (2006.01) |
| *G06F 16/84* | (2019.01) |
| *G06F 16/21* | (2019.01) |
| *G06F 16/901* | (2019.01) |
| *G06F 16/9038* | (2019.01) |

(52) U.S. Cl.
CPC ............ *H04L 41/12* (2013.01); *G06F 16/219* (2019.01); *G06F 16/84* (2019.01); *G06F 16/9024* (2019.01); *G06F 16/9038* (2019.01); *H04L 41/22* (2013.01)

(58) Field of Classification Search
CPC ............ G06F 11/0751; G06F 11/0781; G06F 16/219; G06F 16/84; G06F 16/9024; G06F 16/9038; H04L 41/0853; H04L 41/12; H04L 41/22
See application file for complete search history.

(56) References Cited

U.S. PATENT DOCUMENTS

| | | |
|---|---|---|
| 7,617,073 B2 | 11/2009 | Trinon et al. |
| 8,606,912 B1 | 12/2013 | Moon |

(Continued)

OTHER PUBLICATIONS wiki.servicenow.com, Product Documentation, "Event Management", Date Unknown, Downloaded Mar. 31, 2017, http://wiki.servicenow.com/index.php?title=Event_Management#gsc.tab=0, 8 pp.

(Continued)

*Primary Examiner* — Joshua P Lottich
(74) *Attorney, Agent, or Firm* — Fletcher Yoder PC

(57) ABSTRACT

A system for generating a node map including current and historical information regarding a condition of a component of a computing infrastructure is disclosed. The system includes a server including a processor and a memory that includes instructions executable by the processor to receive an event associated with the condition of the component, wherein the event includes an event time and indication of a severity associated with the event, determine an impact value on the component based on the indication of the severity associated with the event, generate a time series datum in a time series data store, for the component, based on the event time and the impact value, and generate the node map that includes a node representative of the component including a node icon having, associated with the component, a first indicator of the impact value and a second indicator of historical impact values based on the time series data store.

20 Claims, 10 Drawing Sheets

(56) References Cited

U.S. PATENT DOCUMENTS

| | | | |
|---|---|---|---|
| 2006/0164997 A1* | 7/2006 | Graepel | G06F 11/3447 370/241 |
| 2007/0288791 A1* | 12/2007 | Allen | G06F 11/0709 714/4.11 |
| 2017/0075749 A1* | 3/2017 | Ambichl | G06F 11/079 |
| 2017/0123885 A1* | 5/2017 | Margalit | G06F 11/0709 |
| 2018/0173687 A1* | 6/2018 | Noguero | G06F 16/9024 |
| 2018/0173789 A1* | 6/2018 | Llagostera | G06N 7/005 |
| 2018/0174062 A1* | 6/2018 | Simo | G06N 3/04 |
| 2019/0036797 A1* | 1/2019 | Margalit | H04L 43/045 |

OTHER PUBLICATIONS

Servicenow Documentation, "Alert Management", Date Unknown, Downloaded Mar. 31, 2017, https://docs.servicenow.com/bundle/istanbul-it-operations-management/page/product/event-management/concept/c_EMAlertManagement.html, 22 pp.

Excel Dashboard Templates, "How-To Easily Create a Stacked Clustered Column Chart in Excel", Posted on Mar. 18, 2013, Downloaded Mar. 31, 2017, http://www.exceldashboardtemplates.com/how-to-easily-create-a-stacked-clustered-column-chart-in-excel/, 26 pp.

BMC Software—White Paper, "The BMC Mainview Advantage", Date Unknown, Downloaded Mar. 31, 2017, http://documents.bmc.com/products/documents/83/42/58342/Output/090f44b1803b0d29.htm, 15 pp.

* cited by examiner

FIG. 7

| NAME | IMPACT ON INFLUENCE | INFLUENCE UNIT | IMPACT VALUE WHEN CRITICAL | IMPACT VALUE WHEN MAJOR | IMPACT VALUE WHEN MINOR | IMPACT VALUE WHEN WARNING |
|---|---|---|---|---|---|---|
| Application Member | Parent | 100 Percent | Critical | Minor | Minor | Warning |
| Containment | Business Service | 100 Percent | Critical | Major | Minor | Warning |
| Storage Path | Business Service | 100 Percent | Minor | Minor | Minor | Warning |
| Cluster Member | Business Service | 70 Percent | Critical | Major | Minor | Warning |

FIG. 8

| ELEMENT ID | BUSINESS SERVICE | IMPACT VALUE | START | END |
|---|---|---|---|---|
| 548FFB6C | 4AFFB8C | CRITICAL | 2/10/2016 3:48:33 | 2/10/2016 3:49:23 |
| 548FFB6C | 4AFFB8C | INFO | 2/10/2016 3:49:23 | |

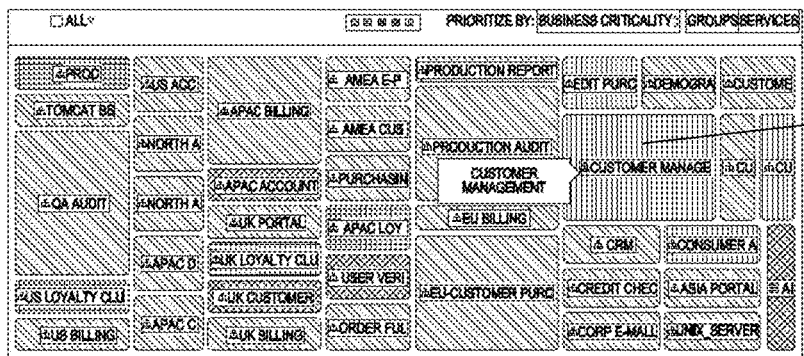
FIG. 10A
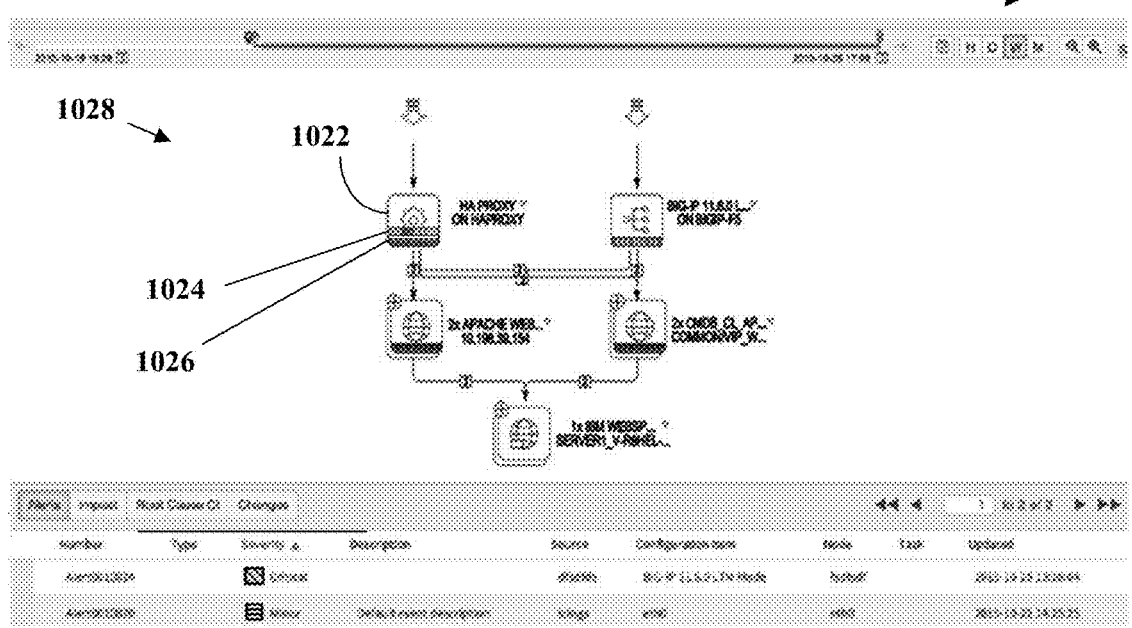
FIG. 10B
FIG. 10C
FIG. 10D

SYSTEM AND METHOD FOR PROCESSING OF CURRENT AND HISTORICAL IMPACT STATUS INFORMATION

BACKGROUND

A computerized service can be implemented using interconnected components of a computing infrastructure represented by a collection of configuration items (CIs) and relationships between the CIs. The CIs can be stored in a configuration management database (CMDB) system which can be used to respond to user requests for information about the computerized service. Such a system can be used to generate graphs or node maps representative of the interconnected components of the computerized service.

SUMMARY

Disclosed herein are implementations of processing of current and historical impact status information.

In an implementation, a system for generating a node map including current and historical information regarding a condition of a component of a computing infrastructure. The system includes a server including a memory and a processor. The memory includes instructions executable by the processor to receive an event associated with the condition of the component, where the event includes an event time and an indication of a severity associated with the event, determine an impact value on the component based on the indication of the severity associated with the event, generate a time series datum in a time series data store, for the component, based on the event time and the impact value, and generate the node map that includes a node representative of the component, wherein the node includes a node icon having a first indicator of the impact value associated with the component and a second indicator of historical impact values associated with the component based on the time series data store.

In an implementation, a method includes receiving an event associated with the condition of the component, wherein the event includes an event time and an indication of a severity associated with the event, determining an impact value on the component based on the indication of the severity associated with the event, generating a time series datum in a time series data store, for the component, based on the event time and the impact value, and generating a node map that includes a node representative of the component, wherein the node includes a node icon having a first indicator of the impact value associated with the component and a second indicator of historical impact values associated with the component based on the time series data store.

In an implementation, a non-transitory computer-readable storage medium is provided for generating a node map including current and historical information regarding a condition of a component of a computing infrastructure. The medium comprises executable instructions that, when executed by a processor, facilitate performance of operations, comprising receiving an event associated with the condition of the component, wherein the event includes an event time and an indication of a severity associated with the event, determining an impact value on the component based on the indication of the severity associated with the event, generating a time series datum in a time series data store, for the component, based on the event time and the impact value, and generating the node map that includes a node representative of the component, wherein the node includes a node icon having a first indicator of the impact value associated with the component and a second indicator of historical impact values associated with the component based on the time series data store.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIG. 7 is an illustration of an implementation of an impact rule table referencing impact rules used for impact value calculation.

FIG. 8 is an illustration of impact values stored in a time series data store.

FIGS. 10A-10D are illustrations of example graphical user interfaces.

DETAILED DESCRIPTION

Figure 1:
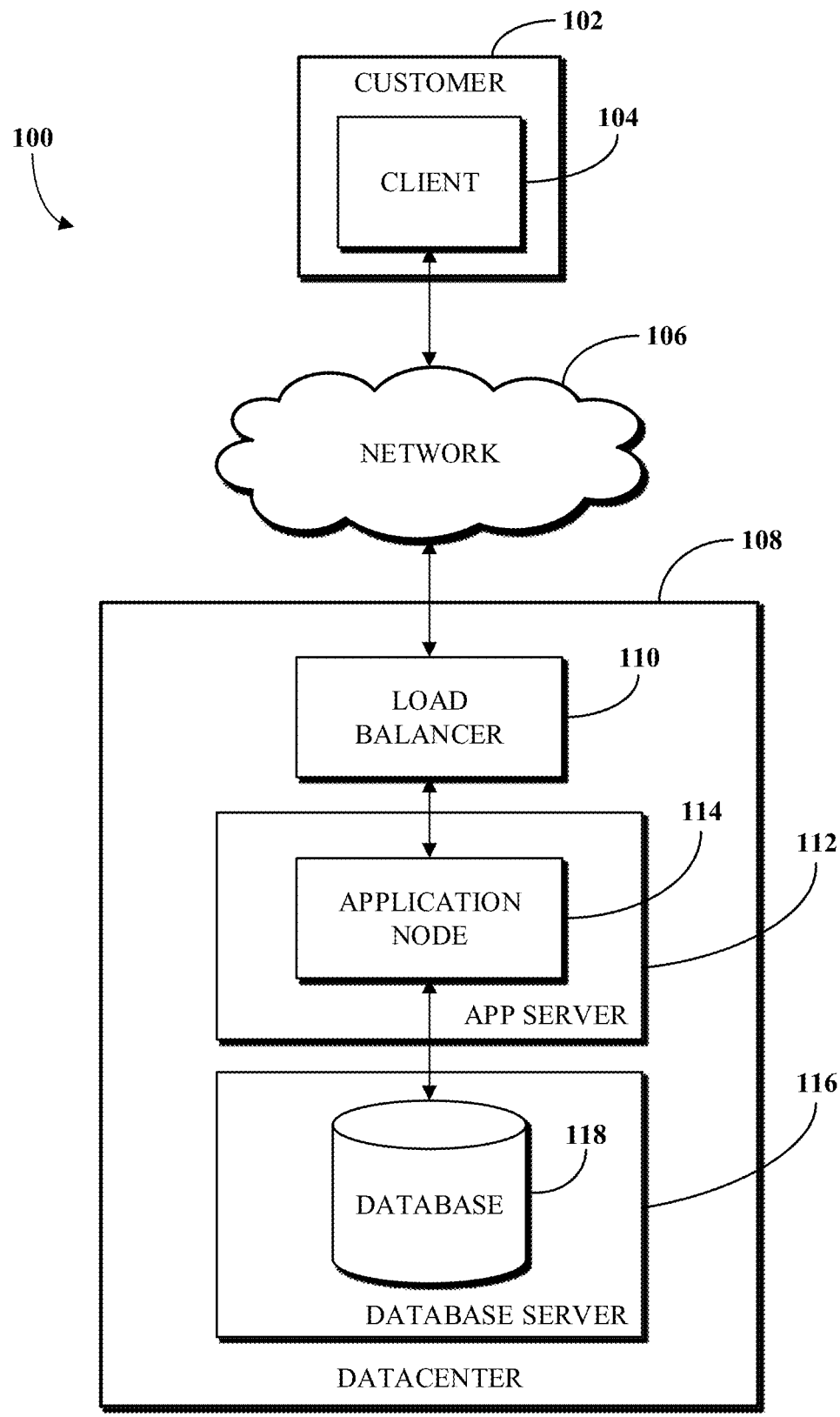
FIG. 1 is a block diagram of an example of an electronic computing and communications system.

An enterprise can deploy in its computing infrastructure thousands of assets which can be, for example, physical devices (such as routers, switches, personal computers, servers, and the like), enterprise software systems (such as database management systems, CRM systems, IT operation management systems, PLM systems, ERP systems, homegrown systems, financial systems, HR systems, and the like), and client-based applications (such as office applications). These assets, referred to herein as components or components of a computing infrastructure, can be managed in a configuration management database (CMDB) system as configuration items (CIs). CIs that collectively provide a computerized service can be grouped together as a business service using the CMDB. The computing infrastructure can be a computing (i.e., information technology or network) environment that is managed or controlled by the enterprise, a service provider that provides services to the enterprise, or a combination thereof.

The CMDB, for example, can respond to a request to display a business service by rendering a directed graph or node map showing all the CIs of the business service and the connections between them. An administrator can use such node maps to, for example, understand the effect of an issue or outage on one CI of the business service on other CIs in the business service and the business service itself. It may be advantageous to display both current and historical information about the CIs at one or more nodes of the node map.

For example, events and/or alerts may be generated by monitoring systems which monitor the assets represented by the CIs. The events and/or alerts can be used to generate an impact value for one or more CIs. The impact value of a first CI may affect (e.g., impact) the impact values of other CIs that depend on the first CI. The impact value may be represented as a status that is displayed for the CI (e.g., a color or percentage associated with the impact value). A business service map may display the current status of a CI. The business service map may also show how the current impact value of a CI can impact other CIs of the business service.

In some cases, it may be advantageous to convey the health of CIs or a business service over a period of time. For example, by looking at a current status only, an administrator may get a false sense that a CI or a business service are functioning properly because the current status shows a green or clear status, while, in fact, it has been exhibiting systemic problems (e.g., over the last 7 days, the CI was in red, or critical, status 40% of the time). Furthermore, by displaying only the current status, the user may not be able to quickly determine that CIs of a business service are exhibiting chronic or repetitive issues which may require investigation and resolution before the status of a business service becomes "critical." When a business service reaches a "critical" status, it may be unavailable, which may result in lost revenue, reduced customer satisfaction, or missed deadlines.

To overcome these problems, it may be advantageous to simultaneously provide a current status and a historical status display of the CIs of a business service. The terms "status," "impact," "impact value," and "impact status," may be used interchangeably throughout this disclosure to refer to a result of performing an impact calculation and/or an impact, or status value or indicator for a CI which can also be referred to as a node.

Implementations of this disclosure provide technological improvements particular to computer networks, for example, those concerning the display of status information related to a CI of a business service. Computer network-specific technological problems, such as identifying historical and current impact values for a CI based on events occurring on other CIs, can be wholly or partially solved by implementations of this disclosure. For example, the present disclosure provides for generating a node map that includes and can simultaneously display current and historical impact status information on CIs within a business service map. Implementations of this disclosure can thus introduce new and efficient improvements in the ways in which impact values of a CI, and the network of CIs that make up the business service, are calculated, aggregated and displayed.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as a database 118, which can be accessible by software executed on the application node 114. The database 118 may be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, the system 100 for generating a node map that includes historical and current information regarding conditions of components, such as components 526 of FIG. 5, can receive events from the customer 102 and datacenter 108 computing infrastructures, can generate a graphical user interface using application node 114, and can store time series data in database 118. In some implementations, the systems and techniques described herein, portions thereof, or combinations thereof can be implemented on a single device, such as a single server, or a combination of devices, for example, a combination of the client 104, the application server 112, and the database server 116.

Non-limiting examples of components include network resources (e.g., Ethernet switches, a network router, a load balancer, etc.), software resources (e.g., web-based applications operable on a Java Virtual Machine, interface software for use with a database, firmware for operating a connected hardware resource, JavaScript for configuring platform software, etc.), storage resources (e.g., network attached storage, direct-attached storage, backup and/or recovery servers, etc.), or database resources (e.g., for storing information usable in connection with a web-based application or platform).

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
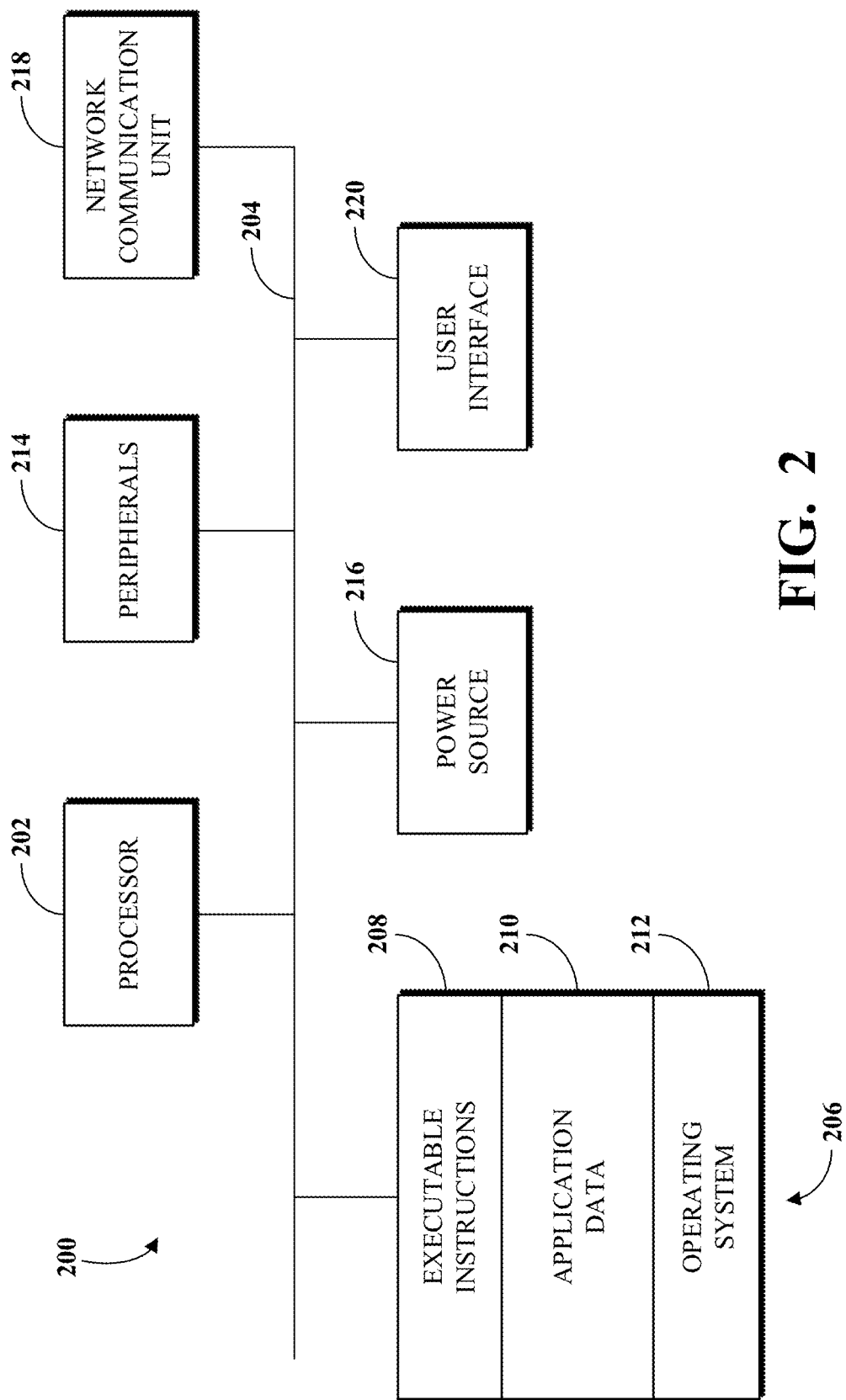
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to simultaneously display historical and current information regarding conditions of components of a computing infrastructure.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Reference is now made to FIGS. 3-10 to further describe implementations of systems and techniques for simultaneous display of current and historical impact information on configuration items of a business service.

Figure 3:
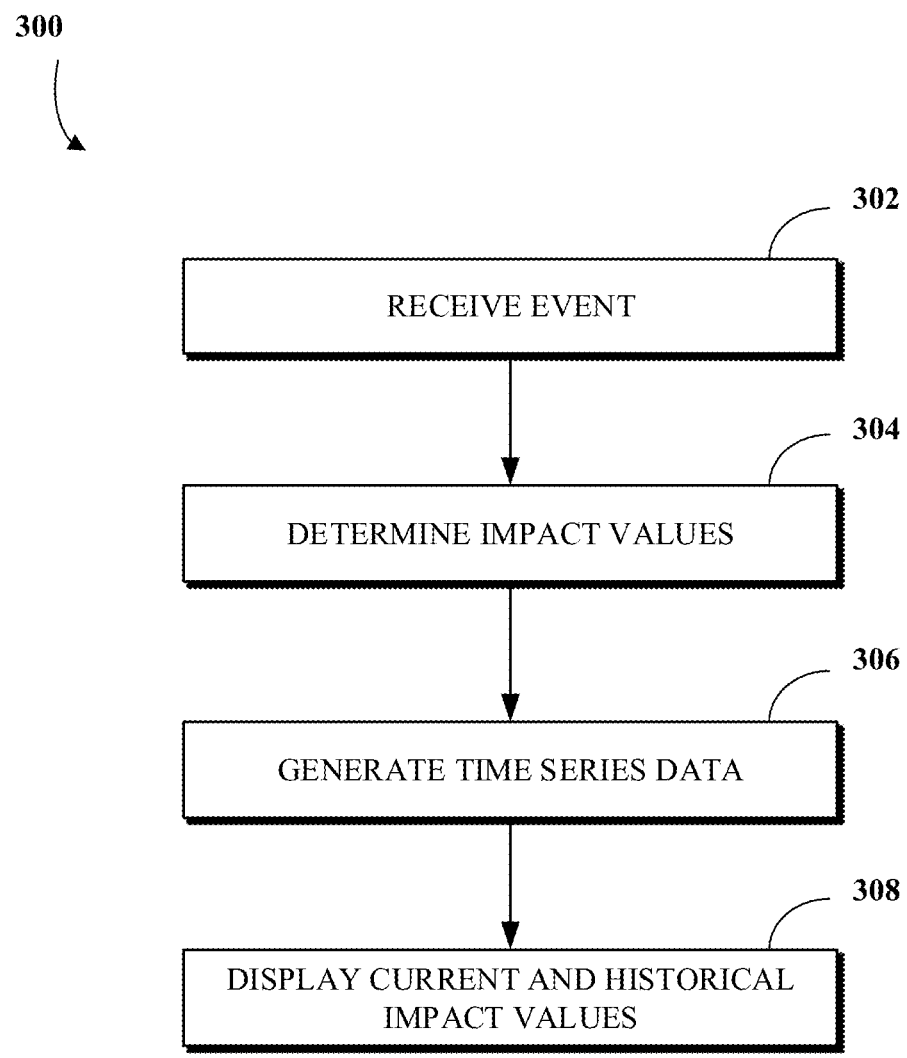
FIG. 3 is a flowchart illustrating a technique for the simultaneous display of current and historical impact information of components of a computing infrastructure.

FIG. 3 is a flowchart illustrating a technique 300 for the simultaneous display of current and historical impact information of components of a computing infrastructure. The computing infrastructure can comprise the system 100 as illustrated in FIG. 1. The technique 300, and other techniques described herein, such as techniques 400, 600, 900, and 1100 of FIGS. 4, 6, 9, and 11 respectively, can be executed using computing devices, such as the systems, modules, and devices described with respect to FIGS. 1 and 2. In some implementations, the techniques 300, 400, 600, 900 (of FIG. 9) can be performed, for example, by executing a machine-readable program or other computer-executable instructions, such as instructions or programs described according to JavaScript, C, or other such instructions. The steps, or operations, of the techniques 300, 400, 600, 900 or any other technique, process, or algorithm described in connection with the implementations disclosed herein can be implemented directly in hardware, firmware, software executed by hardware, circuitry, or a combination thereof.

The technique 300 includes steps 302, 304, 306, and 308. At step 302, the technique 300 receives, from event sources in the computing infrastructure, events indicative of conditions of at least one component of a plurality of components (or CIs) of a computing infrastructure. An implementation of step 302, receive event, is further described below with reference to FIGS. 4-5. At step 304, the technique 300 determines the impact of the received event (i.e., impact values) on the at least one component of the computing infrastructure. An implementation of step 304, determine impact values, is further described below with reference to FIGS. 6-7. At step 306, the technique 300 generates time series data of the determined impact values for the at least one component, based on the event time and the impact values as further described below in an implementation with reference to FIG. 8.

At step 308, the technique 300 displays current and historical impact values. The display of current and historical impact values is accomplished by generating a graphical user interface including a graph of nodes representative of the plurality of components in the computing infrastructure, wherein the graph's lines connecting the nodes are representative of the relationships between components. At least one node of the graph of nodes is represented using a node icon, wherein the node icon includes a first indicator of a current impact value associated with the corresponding component and a second indicator of past impact values associated with the corresponding component based on the generated time series data. An implementation of step 308 is further described below with reference to FIG. 9.

Figure 4:
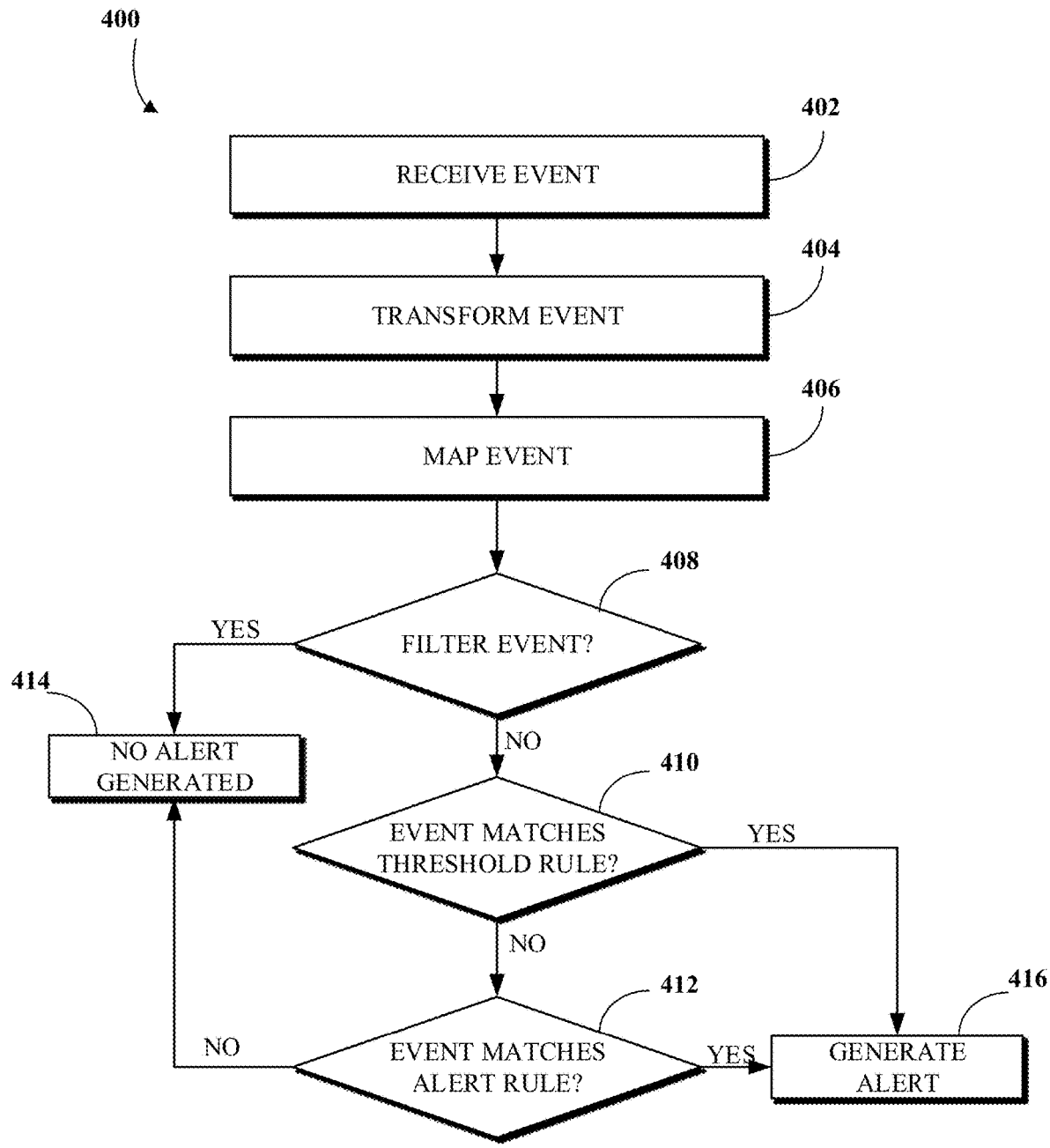
FIG. 4 is a flowchart illustrating a technique for event management.

FIG. 4 is a flowchart illustrating a technique 400 for event management. In an implementation, the technique 400 can be executed by an event management module, such as the event management module 512 of FIG. 5 described below. The technique 400 includes steps 402, 404, 406, 408, 410, 412, 414, 416. At step 402, the event management module receives an event from, for example, an event source as described below with reference to FIG. 5. The event can be configured to contain identifying information such as a source, a type, a node, a resource, an event class, a severity (i.e., an indication of a severity, a severity value, an importance level), and a message key. The source information can indicate a monitoring tool, such as monitoring tool 528 of FIG. 5 that generated the event. The type information can indicate a category used by the source to identify the event. A node can indicate a component (i.e., a component of a computing infrastructure), such as components 526 of FIG. 5, that is a physical or a virtual component, causing the event. The resource information can indicate a component on the node (such as, for example, CPU, memory, graphics card, Tomcat application, a virtual machine, etc.) to which the event applies. The message key information can indicate the event's unique key. Additional, fewer, or other identifying information or semantics of an event can be available.

At step 404, the technique 400 transforms the received event according to transform rules. The transform rules can, for example, normalize events or transform events based, at least, on the identifying information of an event matching defined criteria. The transform rules can identify which events to transform based on a set of matching conditions, identify which events should be ignored, specify event fields to add or update, or any combinations thereof.

An event transform rule can be configured to contain any of a name field for identifying the transform rule, an event class field, event match fields, an ignore indicator field, and an event compose list. The name field can be representative of a function of the transform rule or an arbitrarily assigned name. The event class field can identify the class of events to which the transform rule applies. The event match fields can indicate the list of field values an event must contain for the transform rule to be applied to the event. The ignore indicator can cause the technique 400 to stop processing events matching the event match fields. The technique 400 can insert or update values in the event based on the fields identified in the event compose list for events matching the event match fields. By way of example and without limitation, a transform rule can be configured such that if an event matches an event match field "description=linuxl," then the technique 400 can insert "field=operating system" and "value=unix" into the event or a corresponding alert (described below) as specified in the event compose list.

An event transform rule may be configured to, for example, be processed by the technique 400 for a received event only when the received event's event class is "SRV Monitor," the description has a value "link down on port," and resource has a value of "port." When the rule is processed, the technique 400 can, for example, be configured to set the type field to "link down." Additional, fewer, or other identifying information or semantics of an event transform rule can be available.

At step 406, the technique 400 maps the event using event mapping rules by performing additional normalization and transformation on the received and transformed events. The technique 400 can copy and can update event values for particular event fields according to the event mapping rules. The technique 400 can execute an event mapping rule when the event class of a received event matches an event mapping rule's event class. Other implementations of matching rules are available. By way of example and without limitation, an event mapping rule can be configured to be processed when, for example, an event's event class has a value of "Trap From Enterprise 9" and the event's event additional information field contains an "snmpTrapOID" element with a value of either "iso.org.dod.internet.private.enterprises-.vendor.0.0" or "iso.org.dod.internet.private.enterprises-.vendor.0.1." When this event mapping rule is processed, the technique 400 can set the event's snmpTrapOID element to the value of "tcpConnectionClose."

At step 408, the technique 400 filters the event by determining whether to ignore a received event or stop further processing of the event. The technique 400 can be configured to filter an event if the event is a duplicate event, if it is an irrelevant event, or a combination thereof. If the event should not be filtered, then processing continues to step 410, but if the event should be filtered, then an alert is not created and the processing terminates at step 414. At step 408, the technique 400 can be configured to not generate alerts for events matching filtering rules. Filtering rules can specify conditions based on event field values such that when the conditions are met by a received event, an alert may not be created for the event. By way of example and without limitation, a filtering rule can be configured with a "severity=Clear," (i.e., the indication of the severity associated with the event=Clear) When an event with the severity field set to the value "Clear" is received at step 402, the technique 400 can filter the event at step 408 and can cause processing of the event to stop at step 414 without the generation of an alert.

An alert can indicate that an event is considered important and requires further attention and tracking. Multiple events can correlate to a single alert. Alerts can be manually created by a user, can be programmatically created not in response to an event, can be dynamically created, or any combination thereof. Other techniques for creating alerts can be available. In an implementation, "alert" and "event" and related terms can refer the same entity. An event can be a processed event or in other words, an event can become an alert as an event is processed by a process, such as the technique 400. An alert can be a separate entity from the event from which the alert generated. An alert can be related to the event that causes the alert to be generated. An alert can be related to multiple events where at least one of the multiple events caused the alert to be generated.

An alert can be configured to contain a source, a node, a resource of the node, a severity, a state, a configuration item (CI) indicating the CI associated with the alert, a flag indicating whether the resource is under maintenance, a parent field indicating a parent alert for the alert if any (e.g., a parent alert can be a related alert that occurred earlier), an initial event time field which can indicate a time of occurrence of an event that caused the alert to be generated, a last event time field, a created time, and an updated time which can indicate the most recent time that the alert information was updated. The last event time field can indicate a last time of occurrence of an event similar to an event linked to the alert. An event can be similar to another event when fields of the two events match certain conditions. Additional, fewer, or other fields can be configured for an alert. The technique 400 can be configured to set values for some of the alert fields based on the values of the corresponding event fields. The fields of an alert can be added to the fields of an event. The severity can be configured to be one of the values, in decreasing impact value including but not limited to critical, major, minor, warning, or clear. In another implementation, the severity can coincide with colors such as red for critical, orange for major, yellow for minor, blue for a warning, and green for clear. Additional, fewer, or less severities can be available. The state field can be configured to be one of the values: open, reopen, flapping, or closed. Additional, fewer, or less state values can be available.

Referring back to FIG. 4, at step 410, the technique 400 determines whether the received event matches a threshold rule. If yes (the event matches the threshold rule), then an alert is created at step 416. If no, the processing advances to step 412 where the technique 400 determines whether the received event matches an alert rule. An alert can have a category field indicating whether the alert was created by a threshold rule. A threshold rule can cause the technique 400 to create an alert when event field values are met or exceeded. A threshold rule can be configured such that the technique 400 creates an alert when the same event occurs a specified number of times within a specified period of time. A threshold rule can be configured such that an existing alert is closed when a similar event occurs a specified number of times within a specified period of time. At step 416, the technique 400 can create an alert and populate at least some of the alert fields as described above.

At step 412, the technique 400 determines whether a received event matches alert rules. Alert rules can be configured to modify an alert before an existing alert is updated or a new alert is crated. An alert rule can be used, for example, to reduce the impact of an alert on CIs which are under planned maintenance. A CI can be determined to be under planned maintenance by consulting, for example, a configuration management database (CMDB), such as CMDB 504 of FIG. 5. A CI can be determined to be under planned maintenance when the CI is undergoing a certain process such as, for example, a change control process. If an event matches an alert rule, control passes to step 416 where the technique 400 can create or update an alert. Otherwise, control passes to step 414 and no alert is created.

An alert can be configured to have an active interval. An active interval of an alert can identify a time duration in which a received event, with the similar identifying information as a previous event related to the alert, can update the alert. For example, events received within the active interval of an alert result in the updating of the alert, whereas events received outside the active interval result in the creation of new alerts, or any combination thereof.

An alert can be configured with flapping criteria. Flapping criteria can include a flap count field, indicating the number of times the alert has flapped (i.e., a flap count), and a flap start window indicating an initial start time to measure the flapping occurrences (i.e., a flap interval). Flapping can indicate that alerts relating to a resource fluctuate between two severities, such as, for example, a critical and non-critical severity. The technique 400 can be configured to update an existing alert based on a received event when the alert is determined to be in a flapping state and can be configured to create a new alert when the alert is determined to not be in a flapping state. An alert can be set to flapping state when the alert's flap count is equal to or greater than a flap frequency within the period of the flap interval. In another implementation, the flap count compared to a pre-determined or dynamically updated threshold value. An alert can be set to a non-flapping state when the time interval between the latest occurrence of the event and the flap last update time is greater than a flap quiet interval.

The technique 400 encompasses certain implementations of event management. Other implementations are possible. For example, steps described in FIG. 4 can be combined with other steps, modified, or omitted. Other steps can be added. For example, in an implementation, steps 404 and 406 may be combined. In an implementation, the technique 400 may not perform steps 408, 410, 412 or any combination thereof. In an implementation, the event management module may not create or update alerts, rather the event management module operates on events only. Other variations with respect to event management are also contemplated.

Figure 5:
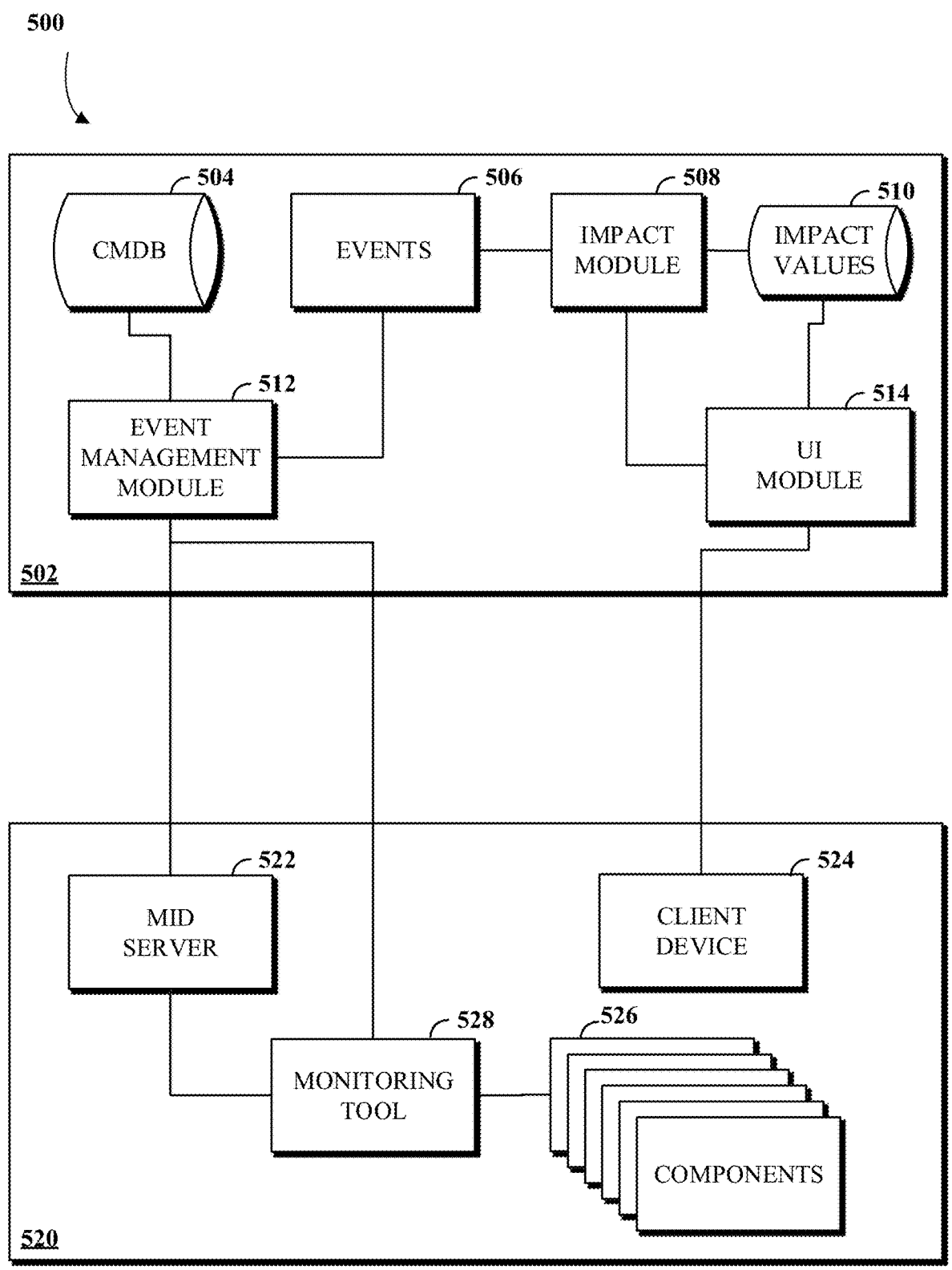
FIG. 5 is a block diagram of an implementation of an environment for rendering current and historical impact information.

FIG. 5 is a block diagram of an implementation of an environment 500 for rendering current and historical impact information. The current and historical impact information is of configuration items (CIs) on a generated map of a computing infrastructure. The environment 500 includes a service provider environment 502 and a customer environment 520. The service provider environment 502 and the customer environment 520 are examples of computing infrastructures.

The service provider environment 502 includes a CMDB 504, an events module 506, an impact module 508, an impact values module 510, an event management module 512, and an UI module 514, or any combination thereof. In an implementation, the service provider environment 502 can be implemented using the datacenter 108, the computing device 200, the application server 112, the application node 114, or a combination thereof of the components of the system 100.

The customer environment 520 includes a MID server 522, a client device 524, a plurality of components 526, a monitoring tool 528, or any combination thereof. The components 526 are examples of components of a computing infrastructure. In an implementation, the customer environment 520 can be implemented using the customer 102 of FIG. 1 and the MID server 522, the client device 524, and the plurality of components 526 can be implemented using the client 104 of FIG. 1, the computing device 200 of FIG. 2, or a combination thereof. In an implementation, the customer environment 520 is a network-connected computing infrastructure which includes the plurality of components 526. The plurality of components 526 can represent network resources (for example, Ethernet switches, a network router, a load balancer, etc.), software resources (for example, web-based applications operable on a Java Virtual Machine, interface software for use with a database, firmware for operating a connected hardware resource, JavaScript for configuring platform software, etc.), storage resources (for example, network attached storage, direct-attached storage, backup and/or recovery servers, etc.), or database resources (for example, for storing information usable in connection with a web-based application or platform). The foregoing examples, including the specific resources listed and connections described, express or implied, are non-limiting.

The customer environment 520 can be in communication with the service provider environment 502 such as by way of a network. Such a network can be a WAN, LAN, point-to-point link, or any other network link capable of permitting communication between network interfaces of devices within the customer environment 520 and the network interfaces of devices within the service provider environment 502.

The service provider environment 502 is an on-premises software installation. As such, the service provider environment 502 can be within or in close communication with the customer environment 520 and/or can be more controlled by the customer for which the customer environment 520 is associated. The service provider environment 502 can be administered by a third party service provider. In an implementation, the service provider environment 502 is implemented using an instance of application software and database schema and records within a single-tenant hosted environment.

The CMDB 504 includes records of CIs and relationships between CIs. Information within the CMDB 504 can be populated using, for example, a discovery process. A discovery module (not shown) can perform the discovery process in conjunction with the MID server 522. The discovery module can cause the MID server 522 to send probes into the network-connected computing infrastructure of the customer environment 520 to identify network-connected devices and to collect information about network-connected devices, such as attributes of the devices and software modules executing on or installed on said devices. The information returned by the probe can be processed, e.g., by a sensor operating on the MID server 522, by the discovery module, or a combination thereof. The processed information can be used to update the CMDB 504. The discovery process can, for example, be a horizontal discovery process whereby all devices within a particular scope, segment, subset, or range are discovered, or a contextual discovery process whereby devices and software are iteratively discovered starting from an entry point to a service provided to the discovery process. The plurality of components 526 can be represented as CIs in the CMDB 504 as a result of the discovery process.

The monitoring tool 528 can monitor the plurality of components 526 for conditions of interest. By way of examples, such conditions can indicate low disk space of a component that is a storage device, an ESX server shut down on a component that is a hypervisor, or excessive garbage collection by a component that may be the application node 114. The event management module 512 can receive events indicative of conditions of interest, or other indications of the operation of, e.g., the plurality of components 526 in the customer environment 520 from event sources, such as the monitoring tool 528, in the customer environment 520. The event management module 512 can be configured to receive events from the MID server 522, directly from event sources within or outside of the customer environment 520, from the monitoring tool 528, manually created by a user, or any combination thereof. The event management module 512 can store events in the events module 506. The events module 506 can store alerts as described with respect to FIG. 4. The impact module 508 can be configured to determine how an event impacts a CI and other related CIs of the CMDB 504 as described in an implementation of FIG. 6 further described below. The impact module 508 can be configured to store impact information (e.g., current and historical impact values) in the impact values module 510. The impact values module 510 can store impact values using a time series data store. For example, multiple impact values for a CI may be stored, where at least some impact values have an associated start and end time. The time series data store may be implemented, for example, using a relational database, NoSQL database, or special purpose time series database.

The UI module 514 can be configured to generate graphical user interface information for transmission to the client device 524 or other devices. For example, the UI module 514 can generate forms, lists, task boards, chat interfaces, reports, dashboards, portals, topology maps, business service maps, or other types of user interface screens and elements thereon based on data stored in or controlled by the CMDB 504, the events module 506, the impact values module 510 and the like. The UI module 514 can be configured to generate or transmit graphical elements that are directly rendered on a display of the client device 524 or other device or may be configured to, instead of or in addition, to generate or transmit instructions that can be used by such devices to render a graphical display to a display device or to generate or transmit data that can be used by such devices to render a graphical display based on instructions already stored in such devices, such as in a native mobile or watch application.

Figure 6:
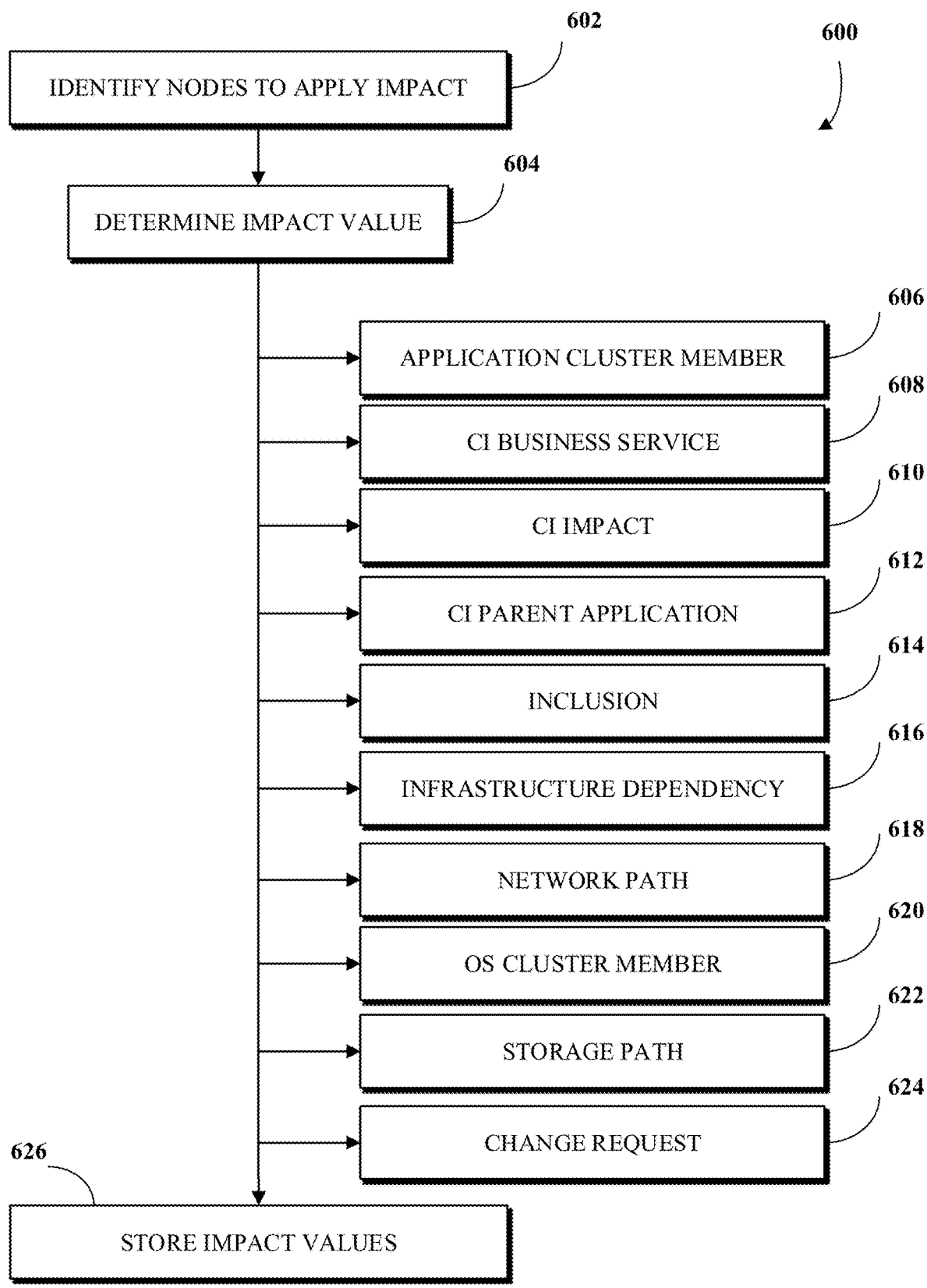
FIG. 6 is a flowchart illustrating a technique for impact value calculation.

FIG. 6 is a flowchart illustrating a technique 600 for impact value calculation. The technique 600 includes steps 602-626. At step 602, the technique 600 identifies nodes or components within a computing infrastructure and then determines an impact value on the identified node using an impact rule at step 604. The impact value is determined by identifying impact rules including but not limited to an application cluster member via step 606, a CI business service via step 608, a CI impact via step 610, a CI parent application via step 612, inclusion information via step 614, infrastructure dependency information via step 616, a network path via step 618, an OS cluster member via step 620, a storage path via step 622, and a change request via step 624. Once the impact value is determined via step 604 using the information garnered from steps 606-624, the technique 600 stores the impact values via step 626. The technique 600 can determine the degree to which an identified impairment, such as an event or an alert, affects a CI and the extent to which other related CIs in the CMDB (such as the CMDB 504 of FIG. 5) are affected as a result. In an implementation, the technique 600 can be implemented by the impact module 508, the event management module 512, or other modules in the service provider environment 502 of FIG. 5, or any combination thereof.

A target CI in the CMDB can be impacted by an event or an alert generated based on a condition on a component (also referred to as a CI) represented by the target CI itself or by events or alerts on another CI related to the target CI. Related CIs can be child CIs, parent CIs, or CIs related to a CI by other dependency relationships. Child or depending CIs represent some of the plurality of components 526 upon which other of the plurality of components 526 represented by parent CIs depend. The parent-child relationships between CIs can be generated by a discovery process, user-configured, programmatically configured, based on default rules, created by other means, or any combinations thereof. A CI's children can be other CIs connected to the CI within a business service.

In an implementation, a CI can participate in several business services. A business service can be a group of CIs grouped together in a specific way or for a specific purpose. A business service can be a service discovered by a discovery module (not shown), a manually created group of CIs created by connecting existing CIs in the CMDB 504, a technical business service that is a user-defined collection of CIs, or any combination thereof. Other types of business services are also available. The technique 600 can determine the impact value of an event or alert on parent or child CIs according to impact rules. Impact calculations can determine an impact value of an outage on other CIs based on an affected target CI of an event or an alert. Additional, fewer, or other types of impact rules than described herein can be available. The technique 600 can propagate an impact value to parent and child CIs and their parent and child CIs recursively in all the business services that impacted CIs participate.

FIG. 7 is an illustration of an implementation of an impact rule table 700 referencing impact rules used for impact value calculation. Referring to FIG. 6 and FIG. 7 together, the impact rule table 700 may be included as part of a user interface, for example, as a graphical representation output to display on a user computer. The impact rule table 700 comprises rows indicative of impact rules associated with nodes (or components) of a node hierarchy and columns representative of various fields corresponding to the impact rules. The impact rule table 700 includes the data elements including but not limited to name data element 710, impact on 712, influence data element 714, influence unit data element 716, impact value when critical data element 718, impact value when major data element 720, impact value when minor data element 722, and impact value when warning data element 724. The name data element 710 can be indicative of a type of rule as explained further below. The impact on data element 712 can be configured to be a valid type of service for the impact rule. The impact on data element 712 can have a value of "business service" indicating that the technique 600 of FIG. 6 can directly propagate the impact value from a CI to the top most CI representing a business service, without or in addition to, propagating to intermediate CIs between the CI and the top most CI. The impact on data element 712 can have a value of "parent" indicating that the impact module 508 of FIG. 5 can propagate the impact value to a parent CI of the CI within a business service. Other values and semantics for the impact on data element 712 can be available.

The influence data element 714 can be configured to indicate the impact value that an impact rule can set on a parent CI. The influence data element 714 can represent a degree to which the impact values of child nodes affect the impact value of a parent node under the impact rule. The influence unit data element 716 can be configured to be a unit of measure for the influence data element 714. When alerts occur for several child CIs, the technique 600 can be configured to calculate a sum of each influence unit data element 716 of each affected child CI. If the sum exceeds a value of the influence data element 714 of a parent CI, the parent CI can receive the highest impact value in the set. The influence unit data element 716 can be configured to have a value of "Percent" indicating that when the percentage exceeds the value of the influence data element 714, the impact module 508 can set the impact value on the parent. The influence unit data element 716 can be configured to have a value of "Number" indicating that when the number exceeds the value of influence data element 714, the impact module 508 can set the impact value on the parent. Other values and semantics for the influence unit data element 716 can be available.

The influence data element 714 and the influence unit data element 716, together, can be a threshold influence value used to indicate a threshold for how the impact values of child nodes affect the impact value of the parent node. For example, assuming that a threshold value for allowing child nodes to influence the parent node is 100%, and that there are four child nodes, wherein the influence of three of the child nodes is 40% and the influence of the fourth is 70%. If the impact value of two of the 40% influence child nodes is "CRITICAL," but the remaining child nodes have only a "WARNING" impact value or have no identifiable impact value, the threshold is not met for setting the impact value of the parent node to "CRITICAL" based on the influence (e.g., because the sum of the influence values is 80% which does not meet or exceed the threshold of 100%). However, if the impact value for one of the 40% influence child nodes and the 70% influence child node are "CRITICAL," the threshold is met such that the impact value of the parent node may be changed to "CRITICAL" based on the influence (e.g., because the sum of the influence values is 110% which does exceed the threshold of 100%).

The impact rule table 700 can include one or more columns indicating alternative impact values to use for impact rules based on a calculated impact value. For example, impact rule table 700 includes fields indicating how to update or change the impact value for the impact rules where the calculated impact value is "CRITICAL," "MAJOR," "MINOR," or "WARNING". Thus, even where an impact value is calculated for a node, the impact rules (e.g., by default or as configured by a user) may nonetheless further change the impact value. For example, and referring to row 730, where the impact for a node to which the impact rule "STORAGE PATH" applies is calculated to be "CRITICAL," the impact rule may indicate that the impact value should be changed to "MINOR" which represents the impact value. The alternative impact values set for an impact rule are suggested such that a user may decide whether to apply or ignore it, or an algorithm or other process may be used to decide whether or not to apply it. The alternative impact values are automatically used to change a calculated impact value. The impact value when critical data element 718, can be configured to indicate an alternative impact value to apply to the CI when the calculated criticality on the CI is "Critical." For example, and referring again to the row 730 and the "STORAGE PATH" impact rule, assuming that the calculated impact value on a CI is "Critical," the impact rule specified in the row 730 can, instead, set an impact value of "Minor" on the CI. The impact value when major data element 720, the impact value when minor data element 722, and the impact value when warning data element 724 operate similarly to the impact value when critical data element 718.

In an implementation, the impact rule table 700 can have different data elements than those shown in FIG. 7. The impact rule table 700 can have additional data elements, omit data elements, or modify the data elements 710-724. For example, more, less or other criticality levels may be available. For example, the data elements 712 and 714 may be combined. For example, in an implementation, different semantics may be associated with the data elements 710, 712, 714, 716, 718, 720, 722, 724 of the impact rule table 700.

Referring back to the technique 600 of FIG. 6, the step 602 of identifying nodes to apply impact can be configured to generate a list of nodes to which the technique 600 should be applied. The step 602 can comprise generating preliminary node hierarchies based on the resources associated with business services. For example, the step 602 can first include identifying business services resources associated with the business services including dependency relationships between the business services resources. Next, the step 602 can identify infrastructure resources corresponding to the identified business services resources and associating same with the service resource mapping. This may be implemented, for example, by connecting nodes representative of the business services resources to the nodes representative of the corresponding infrastructure resources, or by generating separate layers for the business services resources and corresponding infrastructure resources and indicating a mapping for relating nodes of the layers. Data representative of the nodes may be identified from a network topology representing the hierarchy of and relationships between the nodes of the subject service model. Other implementations of the step 602 can be available. For example, the step 602 can identify all CIs in the CMDB 504 of FIG. 5 as targets for the technique 600. For example, the step 602 can receive a list of specific business services as the target of the technique 600. In such case, the step 602 can identify only those CIs that contribute to the specified business services.

At step 604, the technique 600 can determine, based on the alert, event, CI, CMDB relationships, or any combination thereof, which impact rules to apply. At the step 606, application cluster member impact rule is applied. An application cluster member rule can determine how application cluster members affect the overall cluster. For example, a three-member cluster can be configured with an impact rule as specified in row 740 of FIG. 7 requiring a 70% influence to set the impact value for the entire cluster to Critical. This, in turn, can mean that each member has approximately 23% influence (i.e., 70% divided by 3). The impact value of the entire cluster can only change to Critical when all three members have an impact value of Critical.

At the step 608, a CI business service impact rule can be applied to determine how impact applies to parent or child CIs that are part of a business service. At the step 610, a CI impact rule can be applied to determine the relationship between service members. At the step 610, the CI impact rule, can be configured such that the impact from child to parent CIs is 100%. For example, the parent impact value can be derived from the child CI with the highest impact value. At the step 612, a CI parent application impact rule can be applied to set an impact on the parent entity. At the step 614, an inclusion impact rule can be applied to CIs which have specific type of relationships to a current CI. The specific type of relationship can be a "contains" relationship. At the step 616, an infrastructure dependency impact rule can be applied to determine the definition of impact propagation for CIs in infrastructure relationships. Some CIs may not be part of a business service but can have connections to CIs of a business service. The connections can be connections to infrastructure component CIs such as, for example, a host or an ESX server. An impact rule can be configured to issue the same level of alert to applications running on a host when an alert is issued for a host.

At the step 618, a network path impact rule can be applied when a network path may be affected. A network path impact rule can account for network redundancies by calculating a separate impact value for each element in the network path and reducing the impact value on the impacted CIs by one level. For example, if the calculated impact value is "Critical," the redundancy rule can decrease the impact value by one level to "Major." At the step 620, an OS cluster impact rule can be applied to determine how host cluster members CIs affect the overall cluster CI based on a percentage or number of cluster members. At the step 622, a storage path impact rule can be applied. A storage path impact rule can account for storage device redundancies by calculating a separate impact value for each element in the path and reducing the impact value on the impacted CIs by one level. For example, if the impact value is "Critical," the redundancy rule decreases the impact value by one level to "Major."

At the step 624, a change request impact rule can be applied. A change request impact rule can be configured to exclude from impact calculations a CI meeting certain criteria. The criteria can be that the CI is under planned maintenance, the CI is under change control, or any combination thereof. Additional, fewer, or other criteria can be available for excluding a CI from impact calculations. At the step 626, the technique 600 can store calculated impact values. The calculated impact values can be stored in a time series data store where a stored calculated impact value represents a time series datum for the component. The time series is a series of datum points, each datum related to the time the component is determined to have a new impact value or the component's impact value is changed.

FIG. 8 is an illustration of impact values stored in a time series data store.

Implementations of the time series data store can implement or include a data structure 800, which can be used, for example, by the step 626 of the technique 600 of FIG. 6, to store impact values. In an implementation, the impact values module 510 of FIG. 5 can include the data structure 800. The data structure 800 can include records such as record 830 which can include information about an impact value on a CI within a business service. An element ID data element 810 is a unique ID of a CI. The element ID data element 810 can be an ID of the CI in the CMDB 504 of FIG. 5. A business service data element 812 can be an ID of a business service in the context of which the impact value for the CI of the element ID data element 810 was calculated by the technique 600. The business service data element 812 can be an id of the business service in the CMDB 504. An impact value data element 814 can be the impact value calculated for the CI by the technique 600. A start data element 816 indicates a time that the technique 600 determined that the CI in the element ID data element 810 entered the impact value data element 814. An end data element 818 indicates a time that the technique 600 determines that the CI in the element ID data element 810 exited the impact value data element 814. A record for the CI in the element ID data element 810 in the data structure 800 can be a time series datum for the CI. A time series datum can correspond to the time that an impact value is set for the component, such as when a new record is added to the data structure 800 where the start data element 816 is set but the end data element 818 is not set. A time series datum can correspond to setting the end data element 818 of an existing record in the data structure 800 to a time. The end data element 818 can be set when the CI of the record no longer has the impact value of the record.

The technique 600 can set the end data element 818 based on the technique 600 executing in response to receipt of a new event or alert. The impact module 508 can change the end data element 818 based on determining that an event is flapping. The impact module 508 can change the end data element 818 based on determining that an event or an alert is closed. An alert is closed in response to an action taken. Such action can be, for example, a user manually closing an alert or the closing of an incident associated to an alert. Other actions can be available. The technique 600 can update the end data element 818 based on receiving events and alerts within the active interval of a related event or alert. The technique 600 can create new entries in the data structure 800 upon receiving similar events outside the active interval of an event. The technique 600 can set the end data element 818 upon calculating a new impact value that is different than a last stored impact value data element 814 for a CI of a business service. The end data element 818 can have no value, such as blank or null, to indicate that the value of the impact value data element 814 is the latest calculated impact value and that the latest calculated impact value is still applicable to the CI. For example, as depicted by row 832, CI with ID "548FFB6C" has an "INFO" (i.e., clear) status within the business service "4AFFB8C." The CI entered the "INFO" state as of 2/10/2016 at 3:49:23 and it remains in the "INFO" state.

In an implementation, the data structure 800 can have different data elements than those shown in FIG. 8. In an implementation, the data structure 800 can have additional data elements, omit data elements, or modify the data elements 810-818. For example, the end data element 818 may be omitted. In such a case, an end time for an impact value can be derived based on the data elements 810-816, additional elements stored in the data structure 800, additional elements or logic from outside the data structure 800, or any combination thereof.

Figure 9:
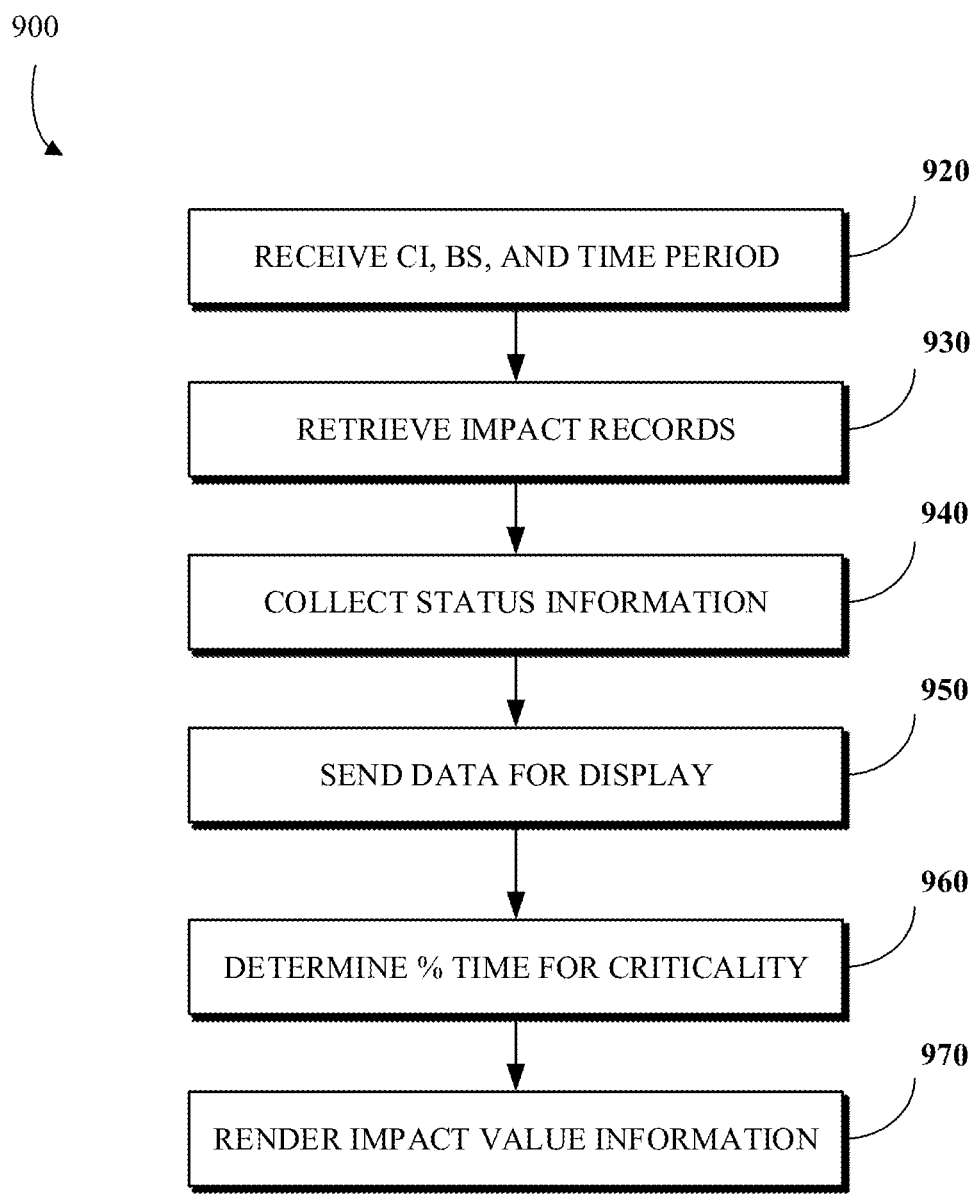
FIG. 9 is a flowchart illustrating a technique for rendering current and historical impact information.

FIG. 9 is a flowchart illustrating a technique 900 for rendering current and historical impact information. Referring to FIGS. 5, 8, and 9 together, in an implementation, the technique 900 can be executed by the impact module 508. The technique 900 can be executed in response to receiving a request. The request can be received from a client, such as the client device 524. At step 920, an identifier of a CI, an identifier of a business service and a time period are received. If a time period is not received, the impact module 508 can use a default time period. The default time period can be configured to be "last 7 days." The default time period is configurable. At step 930, the technique 900 retrieves a query result from the data structure 800 where the element ID data element 810 is the same as the received identifier of the CI, the business service data element 812 is the same as the received identifier of the business service, and the start data element 816 and the end data element 818 match the received time period.

In an implementation, a time period is matched if the start data element 816 is within the time period, if the end data element 818 is within the time period, if both the start data element 816 and the end data element 818 are within the time period, or any combination thereof. At step 940, the technique 900 collects impact values as the impact module 508 iterates over the query result and aggregates a total time by impact value ("total impact value times") based on the start data element 816 and the end data element 818 of each record of the query result. The technique 900 can store the aggregated total times in a, transient or non-transient, data structure that maps each of the impact values to the total time for a respective impact value. The technique 900 can also determine a current status of the CI at the step 940. The current status can be derived from the data structure 800, outside of the data structure 800, or a combination thereof. In accordance with the teachings of this disclosure, a current status of a CI can be the highest level of impact value from among all the CI's own and its children's events or alerts.

At step 950, the technique 900 sends data for display by sending the aggregated total times from step 940 and the current status to the requester. At step 960, the technique 900 determines a % time for criticality as the requester divides the aggregate time of each impact value by the total time of the time period to determine a percent time for each impact value ("a respective percent time"). At step 970, the technique 900 renders impact value information as the requester represents each impact value using a graphical indicator. For example, the requester can represent each impact value by a rectangle and colors each rectangle with a color indicative of the impact value. The color red can indicate a "Critical" impact value, orange can indicate "Major" impact value, yellow can indicate "Minor" impact value, blue can indicate "Warning" impact value, and green can indicate "Info" (i.e., clear) impact value. However, other colors, patterns, symbols, indicators, or combinations thereof can be used. The rectangles can be ordered by impact value from left to right based on an increasing impact value. The requester calculates a position offset and width of each rectangle based on the percent times for each impact value. The rectangles are scaled to fit in an available space. The available space can be an area with specified width and height where the width can be the width of an icon representing a CI on a business service map. The current status can be rendered separately in a separate area.

For simplicity of explanation, the techniques 300, 400, 600, 900 of FIGS. 3, 4, 6, and 9 are depicted and described as series of steps. However, steps in accordance with this disclosure can occur in various orders and/or concurrently. Additionally, steps in accordance with this disclosure may occur with other steps not presented and described herein. Furthermore, not all illustrated steps may be required to implement a technique in accordance with the disclosed subject matter. For example, the step 624 of FIG. 6, may be processed first. For example, the technique 600 can concurrently execute the steps for a collection of CIs. For example, the technique 600 can be run as a background process. For example, the technique 900 can be executed, partially or wholly, by another component of the service provider environment 502 of FIG. 5 such as, for example, the UI module 514 of FIG. 5. In an implementation, instead of the requester performing the steps 960 and 970 of FIG. 9, the UI module 514 can perform necessary processing and only send rendering instructions to the requester. In an implementation, the time data structure 800 can be configured to store data points which can record the start data element 816 such that the technique 900 can calculate, based on the start data element 816 data points, end times for an impact. In an implementation, an identifier of a CI may not be received at the step 920 of FIG. 9. In such case, the technique 900 can determine criticality information for all CIs of the received identifier of a business service and render criticality information for all CIs of the business service.

FIGS. 10A-10D are illustrations of example graphical user interfaces. FIG. 10A depicts a dashboard 1000 configured to display business services of an IT environment such as, for example, the customer environment 520 of FIG. 5. The dashboard 1000 can be configured to display one box per business service where each box can be colored such as according to the impact calculations taught herein. A customer management 1010 business service is shown to have an impact of Critical.

In response to, for example, a user action, such as clicking on a business service in the dashboard 1000, a business service map 1020 of FIG. 10B is generated and displayed. A node map 1028 is generated and can display all the constituent CIs of a business service and the connections between them ("a graph of nodes"). CIs (which represent components of a computing infrastructure) of a business service are depicted on the node map 1028 as icons such as icon 1022. Other graphical representations are also possible. The icon 1022 displays a current status 1026 indicating a current impact value of a CI. The current impact value can be retrieved from an impact values module, such as the impact values module 510 of FIG. 5. For example, the current status 1026 can correspond to impact value information related to the last time series datum (i.e., latest in time) for the CI corresponding to the icon 1022. The current status 1026 can be configured to span the width of the icon 1022 and is configured to be displayed at the bottom of the icon. However, other implementations are available.

A historical status can also be displayed within the icon 1022. In an implementation, historical status 1024 indicating historical impact values resulting from execution of the technique 900 can be configured to be rendered above and abutting the current status 1026 and spanning the width of the icon 1022. The historical status 1024 can be retrieved from the impact values module 510 of FIG. 5. For example, the historical status 1024 can correspond to historical impact value information related to previous time series data for the CI corresponding to the icon 1022. However, other implementations are available.

The business service map 1020 can be configured to allow a user to indicate a date or a date range for which the historical status 1024 is to be generated by the technique 900. For example, a user can select from a menu of options including, without limitation, "today," "last week," "last month," and "last quarter," or the user can specify a date range with the aid of a calendar user interface control. Current and historical status can be displayed on all of a plurality of icons 1022 of the business service map 1020. A user can request that the historical status 1024 be displayed on all or a subset of the icons 1022. For example, the node map 1028 may initially render without displaying the historical status 1024. The user can then cause the historical status 1024 for each of the icons 1022 to be displayed with the selection of a menu option. The user can cause the historical status 1024 to be displayed for one or more of the nodes by, for example, multi-selecting some of the nodes and selecting a menu options to display the historical status 1024 for the selected nodes.

FIG. 10C depicts a textual explanation 1040 of the graphical information depicted in the historical status 1024 of FIG. 10B. The textual explanation 1040 can be displayed when a user hovers or clicks on the icon 1022. A title 1042 can be configured to display the CI (e.g., "HA Proxy") that is the subject of the textual explanation 1040 and a time span of the textual explanation 1040 (e.g., "last 1 week"). For each impact value displayed in the historical status 1024, the textual explanation 1040 can be configured to display an entry 1044. For example, the entry 1044 is configured to display the last exit time (e.g., "2015-10-21 13:01:56") of the CI from a state (e.g., "Critical") within the time span and the total length of time that the CI spent in in that state (e.g., "3 Days 19 Hours 14 Minutes). Other implementations and configurations of the textual explanation 1040 are available. For example, instead of or in addition to the last exit time, the entry 1044 can be configured to display the first entry time of the CI into a status within the time span.

FIG. 10D depicts a zoomed display 1046 of the historical status 1024 of FIG. 10B. To improve readability, the view of the historical status 1024 can be expanded (e.g., zoomed). The view can be expanded (zoomed in) and retracted (zoomed out) in response to a user input. For example, a user can zoom the historical status 1024 by double-clicking, by hovering with a mouse pointer, or via some other gesture or user interface interaction, of the historical status 1024. The user can have displayed the percentage value for one or more of the historical impact information. For example, a percent value can be displayed when the user hovers over or clicks an impact value. For example, the percent value can be displayed based on a user preference related to the display of the percent values. The percent value can overlay or can be displayed in the vicinity of the zoomed display 1046. The percent value can be displayed in other ways.

Figure 11:
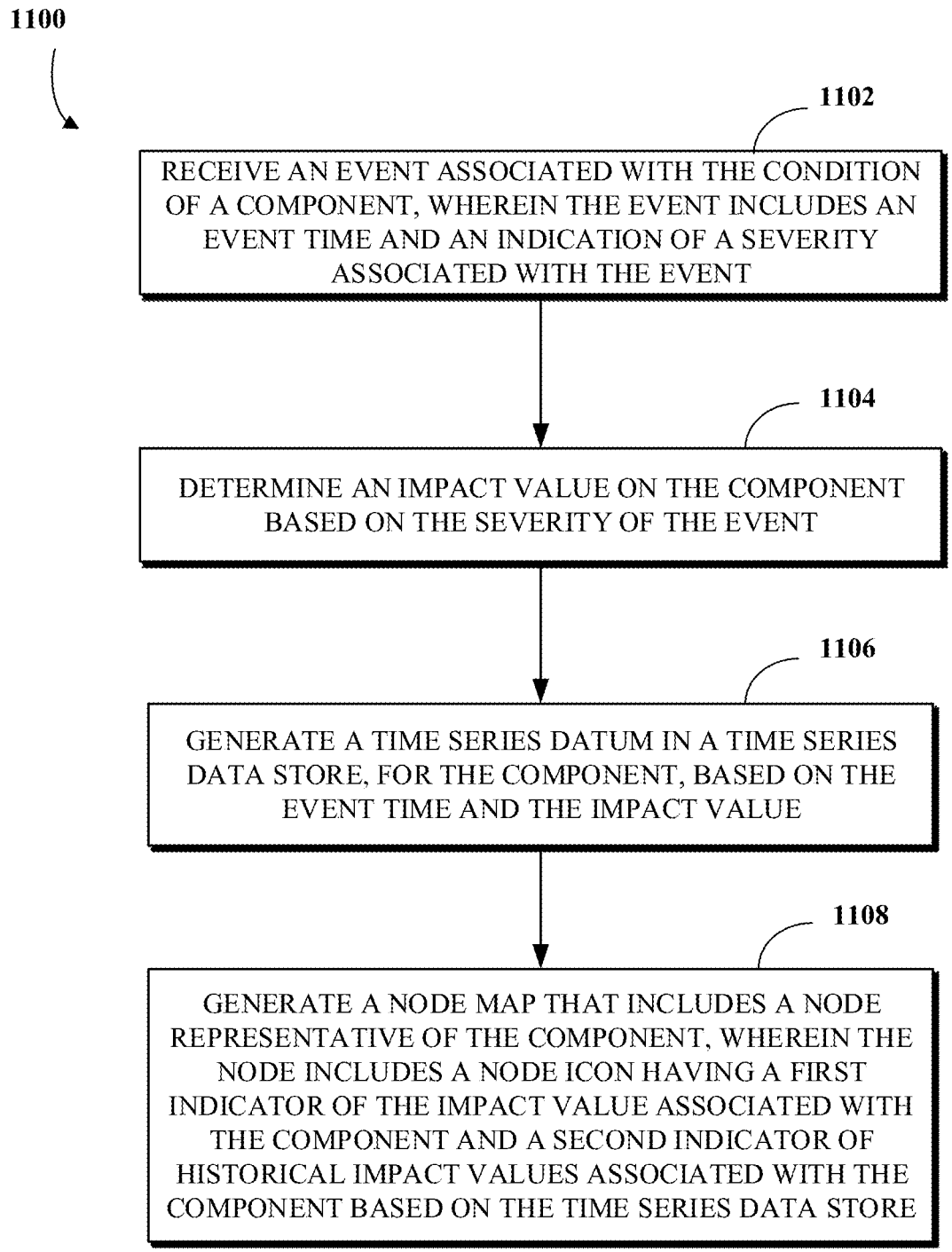
FIG. 11 is a flowchart illustrating a technique for generating a node map including current and historical information.

FIG. 11 is a flowchart illustrating a technique 1100 for generating a node map including current and historical information. In an implementation, the current and historical information relate to a condition of a component of a computing infrastructure. The technique 1100 can be implemented by a service provider environment (similar to the service provider environment 502 of FIG. 5). The technique 1100 can be executed using computing devices, such as the systems, modules, and devices described with respect to FIGS. 1-2 and 5. The technique 1100 can be performed, for example, by executing a machine-readable program or other computer-executable instructions, such as instructions or programs described according to JavaScript, C, or other such instructions. The steps, or operations, of the technique 1100 or any other technique, method, process, or algorithm described in connection with the implementations disclosed herein can be implemented directly in hardware, firmware, software executed by hardware, circuitry, or a combination thereof.

The technique 1100 receives, via step 1102, an event associated with the condition of the component, wherein the event includes an event time and an indication of a severity associated with the event. The indication of the severity associated with the event can be a severity value. The step 1102 can be performed, for example and without limitation, as described with respect to the step 302 of FIG. 3. The step 1102 can be performed by an event management module, such as the event management module 512 of FIG. 5. Technique 1100 determines, via step 1104, an impact value on the component based on the indication of the severity associated with the event or severity value of the event. The step 1104 can be performed, for example and without limitation, as described for the step 304 of FIG. 3. The step 1104 can be performed, partially or completely, by an impact module, such as the impact module 508 of FIG. 5. At step 1106, the technique 1100 generates a time series datum in a time series data store, for the component, based on the event time and the impact value. The step 1106 can be performed, for example and without limitation, as described with respect to the step 306 of FIG. 3. Time series data can be stored in a data store, such as the impact values module 510 of FIG. 5. At step 1108, technique 1100 generates a node map that includes a node representative of the component, wherein the node includes a node icon having a first indicator of the impact value associated with the component and a second indicator of historical impact values associated with the component based on the time series data store. The step 1108 can be performed, for example and without limitation, as described with respect to step 308 of FIG. 3. The step 1108 can be performed by a user interface module, such as the UI module 514 of FIG. 5.

One or more of the graphical user interfaces 1000, 1020, 1040, or other implementations of graphical user interfaces contemplated by this disclosure, can comprise part of a software graphical user interface constituting data that reflect information ultimately destined for display on a hardware device, such as a client 104. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

The rendering of a graphical user interface on a display can be limited by technical constraints of the display, such as a display resolution, or a number of pixels that can be used to display the graphical user interface. It thus can be difficult to include all of the generated data to be displayed to a user within the constraints of the display device. These constraints can be overcome in the context of displaying current and historical information of a condition of a component of a computing infrastructure within the same graphical user interface display by overlaying an indicator of the current status of the component and a graph of historical data for the component on a node representative of that component.

Another implementation of this disclosure is a system for generating a node map including current and historical information of a condition of a component of a computing infrastructure. The system includes a means for receiving an event associated with the condition of the component, wherein the event includes an event time and an indication of a severity associated with the event, a means for determining an impact value on the component based on the indication of the severity associated with the event, a means for generating a time series datum in a time series data store, for the component, based on the event time and the impact value, and a means for generating the node map that includes a node representative of the component, wherein the node includes a node icon having a first indicator of the impact value associated with the component and a second indicator of historical impact values associated with the component based on the time series data store.

All or a portion of the implementations of the systems and techniques described herein can be implemented using a multi-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for generating a node map including current and historical information regarding a condition of a component of a computing infrastructure, the system comprising:
    a server device including a memory and a processor, wherein the memory includes instructions executable by the processor to:
        receive an event associated with the condition of the component, wherein the event includes an event time and an indication of a severity associated with the event;
        determine an impact value on the component based on the indication of the severity associated with the event;
        generate a time series datum in a time series data store, for the component, based on the event time and the impact value; and
        generate the node map that includes a node representative of the component, wherein the node includes a node icon having a first indicator of the impact value associated with the component and a second indicator of historical impact values associated with the component based on the time series data store.

2. The system of claim 1, wherein instructions executable by the processor to generate the second indicator of historical impact values further comprises instructions executable by the processor to:
    retrieve time series data, from the time series data store, for a time interval;
    aggregate total impact value times for each historical impact value of the time series data;
    determine, based on the total impact value times and the time interval, a percent time of the time interval for each historical impact value; and
    generate the second indicator indicative of the percent time and each corresponding historical impact value.

3. The system of claim 2, wherein the second indicator is generated in response to a user input and orders the historical impact values.

4. The system of claim 2, wherein the time interval is received from any of a user input and a system preference.

5. The system of claim 2, wherein the second indicator is a colored rectangle, wherein a color of the colored rectangle indicates a respective impact value.

6. The system of claim 1, wherein the instructions executable by the processor to determine the impact value further comprises instructions executable by the processor to:
    in response to the event satisfying alert generation rules, update an active alert associated with the event when the active alert satisfies the alert generation rules, and create a new alert associated with the event when the active alert does not satisfy the alert generation rules, wherein the alert generation rules map the indication of the severity associated with the event to a severity of the active alert;
    associate the active alert with the component; and
    determine the impact value based on the severity of the active alert.

7. The system of claim 6, wherein to update an active alert is based on receiving the event from event sources in the computing infrastructure indicating flapping conditions of the component, wherein the flapping conditions are determined by the alert generation rules.

8. The system of claim 6, wherein the memory further includes instructions executable by the processor to:
    update the time series data store based on a failure to receive at least one event for the component within an active interval of the active alert.

9. The system of claim 6, wherein the memory further includes instructions executable by the processor to:
    determine, based on an impact rule, a second impact value of the active alert on a second component related to the component, wherein the impact rule comprises an influence value that the impact value contributes to the second impact value and a type of relationship between the component and the second component; and
    generate a second time series datum in the time series data store for the second component.

10. The system of claim 9, wherein the instructions executable by the processor to determine the second impact value of the active alert further comprises instructions executable by the processor to:
    exclude alerts associated with the second component under a change request.

11. The system of claim 9, wherein the node map is associated with a business service, wherein the second component is a business service component when the impact rule is configured to impact the business service.

12. The system of claim 1, wherein the memory further includes instructions executable by the processor to:
    generate a graphical user interface using the node map for rendering on a display.

13. A method for generating a node map including current and historical information regarding a condition of a component of a computing infrastructure, the method comprising:
    receiving an event associated with the condition of the component, wherein the event includes an event time and an indication of a severity associated with the event;
    determining an impact value on the component based on the indication of the severity associated with the event;
    generating a time series datum in a time series data store, for the component, based on the event time and the impact value; and
    generating the node map that includes a node representative of the component, wherein the node includes a node icon having a first indicator of the impact value associated with the component and a second indicator of historical impact values associated with the component based on the time series data store.

14. The method of claim 13, wherein generating the second indicator of historical impact values comprises:
    retrieving time series data, from the time series data store, for a time interval;
    aggregating total impact value times for each historical impact value of the time series data;
    determining, based on the total impact value times and the time interval, a percent time of the time interval for each historical impact value; and
    generating the second indicator indicative of the percent time and each corresponding historical impact value.

15. The method of claim 13, wherein the determining the impact value further comprises:
    in response to the event satisfying alert generation rules, updating an active alert associated with the event when the active alert satisfies the alert generation rules, and creating a new alert associated with the event when the active alert does not satisfy the alert generation rules, wherein the alert generation rules map the indication of the severity associated with the event to a severity of the active alert;
    associating the active alert with the component; and
    determining the impact value based on the severity of the active alert.

16. The method of claim 15, further comprising:
    determining, based on an impact rule, a second impact value of the active alert on a second component related to the component, wherein the impact rule comprises an influence value that the impact value contributes to the second impact value and a type of relationship between the component and the second component; and
    generating a second time series datum in the time series data store for the second component.

17. A non-transitory computer-readable storage medium for generating a node map including current and historical information regarding a condition of a component of a computing infrastructure, comprising executable instructions that, when executed by a processor, facilitate performance of operations, comprising:
    receiving an event associated with the condition of the component, wherein the event includes an event time and an indication of a severity associated with the event;
    determining an impact value on the component based on the indication of the severity associated with the event;
    generating a time series datum in a time series data store, for the component, based on the event time and the impact value; and
    generating the node map that includes a node representative of the component, wherein the node includes a node icon having a first indicator of the impact value associated with the component and a second indicator of historical impact values associated with the component based on the time series data store.

18. The non-transitory computer-readable storage medium of claim 17, wherein the instructions executable by the processor to generate the second indicator of historical impact values comprise:
    retrieving time series data, from the time series data store, for a time interval;
    aggregating total impact value times for each historical impact value of the time series data;
    determining, based on the total impact value times and the time interval, a percent time of the time interval for each historical impact value; and
    generating the second indicator indicative of the percent time and each corresponding historical impact value.

19. The non-transitory computer-readable storage medium of claim 18, wherein the time interval is received from any of a user input and a system preference, and wherein the second indicator is a colored rectangle, wherein a color of the colored rectangle indicates a respective impact value.

20. The non-transitory computer-readable storage medium of claim 17, wherein the instructions executable by the processor to determine the impact value comprise:
    in response to the event satisfying alert generation rules, updating an active alert associated with the event when the active alert satisfies the alert generation rules, and creating a new alert associated with the event when the active alert does not satisfy the alert generation rules, wherein the alert generation rules map the severity of the event to a severity of the active alert;
    associating the active alert with the component; and determining the impact value based on the severity of the active alert.

\* \* \* \* \*